United States Patent Office 2,713,004
Patented July 12, 1955

2,713,004

METHOD OF PREPARING A NACREOUS COMPOSITION AND AN ARTICLE CARRYING A SUBLIMED NACREOUS MATERIAL

Leon M. Greenstein, New York, N. Y., assignor to The Mearl Corporation, New York, N. Y., a corporation of New Jersey No Drawing. Application January 25, 1951, Serial No. 207,839

9 Claims. (Cl. 106—193)

This invention relates to an improved method of producing nacreous compositions and in particular to a technique for the purification and preparation of crystals in the desired form and articles in which is suspended a sublimed nacreous material and also articles which are coated with the same.

A nacreous composition is a generic term used to identify a product known in the trade as pearl essence and indicates generally a clear film-forming vehicle carrying the nacreous pigment so that when applied to a surface it will form a layer having a pearl-like sheen. For example, when a nitrocellulose vehicle containing pearl essence in a concentration of about 3 to 8 per cent is applied to a surface as a coating, a pearly or a nacreous finish is obtained. If the nacreous composition is worked into the body of a transparent plastic material a pearl-like integral sheen is produced. Simulated pearls are small spheres which are produced by coating glass or plastic beads with nacreous compositions of one kind or another. In the application of nacreous compositions an effort is made to orient the crystals in such a manner that their flat broad faces lie parallel to one another and more or less perpendicular to incident light. The result is that when light strikes such crystals which have been incorporated in a surface coating or in a body, it is reflected simultaneously from a great number of crystal surfaces at different depths, thereby producing the velvety pearl-like luster rather than the metallic mirror-like luster characteristic of light reflected from a single surface.

In the preparation of satisfactory nacreous compositions development of crystals of appropriate size and shape is the principal problem. Guanine crystals for instance, which are a constituent of natural pearl essence, when prepared synthetically, consist of thick rods rather than very thin plates and are, accordingly, useless for incorporation in nacreous compositions. Other substances which have found some use as simulated nacreous compositions, such as lead hydrogen phosphate and mercurous chloride, may be crystallized in plates, but nevertheless will not usually have the intense luster of the natural pearl essence.

Accordingly, it is a fundamental object of the instant invention to provide a method for the preparation of suitable plate-like crystals of substances having an appropriate refractive index for use in nacreous compositions.

It is a further object of the invention to provide a method which is particularly useful for forming plate-like crystals of guanine suitable for incorporation into a nacreous composition.

Other objects and advantages of the invention will in part be obvious and in part will appear hereinafter.

The invention accordingly comprises a method of forcing crystals into the plate-like habit of crystal growth which is comprised of the steps of subliming the material forming the crystal, preferably under high vacuum, condensing the vapors of said material on to a sheet, the sheet preferably being of relatively large area and also preferably being coated with a film-forming material corresponding to the desired vehicle for the nacreous composition, stripping the deposited pigment from the sheet, dispersing the stripped pigment material in a vehicle with agitation to induce the desired degree of fragmentation of the parts, thereby obtaining a nacreous composition suitable for ultimate consumption. The invention is applied to the sublimation and formation in plate-like form of any number of crystalline materials, such as pearl essence, guanine, lead chloride, mercurous chloride, and other crystalline compounds, which are characterized by having an index of refraction relatively different from that of the medium of dispersion. Thus, the process consists of the steps and combinations of steps and the relationship of one to the other as involved in the preparation of a nacreous composition which will be described in greater detail in the ensuing specification.

It has been discovered that many materials which are not ordinarily considered volatile are nevertheless subject to distillation or sublimation when heated under a high vacuum. Such materials often form continuous crystalline films or plate-like crystals when condensed on a smooth surface. The thickness of the film or crystal can be determined by the quantity of material condensed on a particular surface. The dimensions of a crystal which will form a suitable nacreous essence may be given as approximately 100 microns in length by 10 microns in width and a thickness of about 1 micron. It should be understood from this that the magnitude of these dimensions is only approximate and the essential desirable characteristic to be obtained is extreme thinness, preferably of the order of one micron, the length and width of the crystal being substantially greater than the thickness. Thus, when a sublimed crystalline film is obtained on a solid surface it may be removed and broken into crystals of suitable size by any convenient method.

A suitable nacreous effect begins to appear when the index of refraction of the medium and that of the crystal differ by approximately 0.2 and improves as the difference increases.

*Example of production.*—Guanine may be considered a good example of a material from which satisfactory nacreous compositions can be prepared. It occurs usually in rather thick rods which, of course, are of a crystal habit very different from the plate-like structure forming the most desirable nacreous composition. However, it sublimes at a temperature of approximately 255° C. under a pressure of approximately $10^{-5}$ millimeters of mercury. Accordingly, in the preparation of a nacreous composition formed of guanine a condenser surface of desired extent, which is smooth, is coated to a thickness of about 1 micron with a nitrocellulose film. Nitrocellulose is specified inasmuch as it is the common film-forming material used in the preparation of nacreous compositions. The film of nitrocellulose, or other film-forming material which may be used, is preferably kept very thin so that in subsequent stripping a desirable high ratio of nacreous material to film vehicle can be attained. The guanine is then subjected to the vacuum with the condensing surface preferably spaced a few centimeters therefrom as it is heated. The amount to be sublimed may be determined in advance and upon completion of the operation it will have condensed on the nitrocellulose surface. Depending upon the extent of the condensing surface a film having the desired thickness will be obtained.

The deposited guanine film adhering to the nitrocellulose film may be put into a useful form, for example, simply by washing the surface with a solvent like butyl-acetate. The nitrocellulose dissolves and the guanine film thus is removed and put into a nitrocellulose vehicle. Careful agitation of the resulting suspension of guanine in the nitrocellulose will fracture the film, producing ultimate crystals having dimensions of the order of those desired for use in pearl essence.

By following this procedure there is produced a suspension of guanine crystals in nitrocellulose lacquer which is a very common form of pearl essence.

In the crystal fracturing operation it is necessary to exercise care to control the degree of fracture obtained for if the agitation is violent or too prolonged, fragments which are too small to give satisfactory orientation may be produced and the condition thus obtained is described as "chalkiness" of the nacreous composition. A form of agitation sufficient to operate gently to fracture the crystals is to enclose the solution in a jar and roll the jar to and fro. The movement thus induced in the solution is sufficient to effect fracture of the crystals.

The weight of actual crystalline material obtained from a single sublimed layer depends upon the extent of the coated area and the thickness of the film deposited. The thickness is kept relatively fixed, for in the optimum control it is held at about a micron. Since common commercial pearl essence preparations contain approximately about 11 per cent by weight of nacreous material, various expedients may be followed to achieve that concentration. The butyl acetate which is used to dissolve the nitrocellulose condensing film may be used repeatedly in a series of operations to increase the concentration of the crystals obtained therein. Additional concentration of the essence may be obtained by settling, centrifuging or by distillation of the solvent. Since the pearl essence is commonly applied to materials in a concentration of about 4 to 8 ounces of pearl essence per gallon of vehicle, which results in a concentration of crystals in the range of 0.34 per cent to 0.69 per cent, the concentration of the sublimed crystals in their vehicle may be halted at this range, to produce the coating material directly useful without dilution.

The nitrocellulose suspension of guanine crystals produced in accordance with the example given is useful in the production of simulated pearls; in fact that is one of its broadest applications. If the essence is to be incorporated in a cellulose acetate object, essentially the same procedure is followed. A cellulose acetate backing film is deposited on the condensing surface, the guanine is sublimed and deposited on that backing and, upon the development of the appropriate thickness of guanine, a suitable solvent such as acetone is employed to remove the deposited film and form the composition.

The technique of preparing a suspension of nacreous crystals in any desired soluble film-forming plastic material is the same, the steps involved being merely, first, to deposit a film of the material on the condensing surface, deposit the nacreous material thereon and then to dissolve the plastic film.

In certain applications a suspension of nacreous composition in an aqueous base is preferred to the usual film-forming lacquer compositions. In making hollow glass pearl beads, for example, a glass sphere is coated internally with a gelatine suspension of pearl essence. Crystals for this application are produced by subliming guanine, for example, on to a gelatine film deposited on a condensing surface, which is subsequently washed with water which dissolves the gelatine, thereby forming the suspension of the crystals in an aqueous solution of gelatine. The same technique is applicable to the use of any other water soluble film-forming agent such as for example, gum tragacanth, which may be deposited in a film and the gum removed by solution in water. Where it is desirable to prepare a concentrate from one of these aqueous compositions the crystals are usually concentrated by settling from the original suspension.

Though the method for the preparation of nacreous compositions has been described principally by reference to sublimation of guanine on to an appropriately treated condensing surface, it is not restricted simply thereto. Any solid material which in plate-like form will have a high index of refraction and which can be sublimed is useful for the purpose. Mercurous chloride is a useful nacreous material, but only when the crystals have the necessary plate-like crystal habit. The same technique as that described in connection with the sublimation of guanine may be used to convert ordinary non-nacreous mercurous chloride to a useful nacreous material having plate-like crystals of optimum thickness.

The method may also be used in the preparation of nacreous crystals from substances having a suitable index of refraction which do not ordinarily crystallize in a suitable plate-like form. Lead chloride belongs to the class and normally forms tubular or columnar crystals which, therefore, may be forced into the plate form when a thin film is deposited on a smooth surface. Lead chloride, of course, is suitable for use as a nacreous material in organic media, but not in aqueous media since it has a decided water solubility which destroys its usefulness for that purpose. In similar fashion other nacreous materials which can be forced into the plate-like form by the sublimation operation and have an appropriate index of refraction may be derived and adapted for use in this type of composition. Among these materials are zinc sulfide and zinc oxide; red nacreous materials may be obtained from stannic iodide and lead di-iodide.

Although the invention has been described with only a limited number of examples, it will be understood that variations may be developed in the individual steps thereof without departing from the spirit or scope of the invention.

What is claimed is:

1. A method of preparing a nacreous composition comprising enclosing a sublimable nacreous-forming material in an evacuated space, heating said material to its sublimation temperature and depositing said material on a clear non-resinous plastic film suitable as a vehicle, said plastic film in turn being supported on an extended smooth surface coated therewith, and subsequently stripping said film carrying the deposited material from said extended surface and fragmenting the said deposited material.

2. The process in accordance with claim 1, in which the starting material is pearl essence.

3. The method in accordance with claim 1, in which the starting material is guanine.

4. The method in accordance with claim 1, in which the starting material is lead chloride.

5. The method in accordance with claim 1, in which the starting material is zinc oxide.

6. The method in accordance with claim 1, in which the starting material is mercurous chloride.

7. The method in accordance with claim 1, in which the plastic material is water soluble.

8. An article of simulated pearl characterized by its being coated with a composition consisting essentially of a vehicle in which is suspended a sublimed nacreous material.

9. An article characterized by its being formed of an organic plastic in which is embedded a pigment consisting essentially of a sublimed nacreous material.

References Cited in the file of this patent

UNITED STATES PATENTS

| Number | Name | Date |
|---|---|---|
| 1,456,532 | Brown | May 29, 1923 |
| 1,683,931 | Stone | Sept. 11, 1928 |
| 2,035,453 | Betterton | Mar. 31, 1936 |
| 2,363,570 | Caprio | Nov. 28, 1944 |
| 2,555,224 | Decker | May 29, 1951 |
| 2,570,408 | Van Gorder et al. | Oct. 9, 1951 |